(12) United States Patent
Chen et al.

(10) Patent No.: US 7,595,565 B2
(45) Date of Patent: Sep. 29, 2009

(54) DO-IT-YOURSELF WIND POWER GENERATION WALL

(75) Inventors: Shih H Chen, Yongkang (TW); Ka-Shing Li, Hong Kong (CN)

(73) Assignee: Jetpro Technology Inc., Tainan (TW)

( * ) Notice: Subject to any disclaimer, the term of this patent is extended or adjusted under 35 U.S.C. 154(b) by 113 days.

(21) Appl. No.: 11/838,437

(22) Filed: Aug. 14, 2007

(65) Prior Publication Data

US 2009/0045633 A1 Feb. 19, 2009

(51) Int. Cl.
*H02P 9/04* (2006.01)
*F03D 9/00* (2006.01)
*F16B 7/04* (2006.01)
*F16D 1/00* (2006.01)
*F16D 3/00* (2006.01)
*F16B 7/00* (2006.01)
*F16B 12/36* (2006.01)
*E04G 7/00* (2006.01)

(52) U.S. Cl. ............................... 290/55; 403/1; 403/49; 403/174; 403/217; 403/294

(58) Field of Classification Search ................... 290/55; 403/1, 49, 169–187, 217–219, 292–298
See application file for complete search history.

(56) References Cited

U.S. PATENT DOCUMENTS

| | | | | |
|---|---|---|---|---|
| 1,876,595 A * | 9/1932 | Beldimano | ................... | 415/60 |
| 3,077,035 A * | 2/1963 | Hackney | ...................... | 33/293 |
| 3,263,232 A * | 7/1966 | Burwell et al. | ............... | 343/713 |
| 4,140,433 A * | 2/1979 | Eckel | ....................... | 415/209.1 |
| 4,203,707 A * | 5/1980 | Stepp | ......................... | 416/119 |
| 4,289,970 A * | 9/1981 | Deibert | ........................ | 290/44 |
| 4,323,331 A * | 4/1982 | Schachle et al. | ............... | 416/9 |
| 4,330,714 A * | 5/1982 | Smith | ........................... | 290/55 |
| 4,486,143 A * | 12/1984 | McVey | ........................ | 415/164 |
| 4,720,640 A * | 1/1988 | Anderson et al. | ............. | 290/43 |
| 4,764,090 A * | 8/1988 | Danson | ........................ | 416/17 |
| 4,801,831 A * | 1/1989 | Lewis | ........................... | 310/91 |
| 4,867,274 A * | 9/1989 | Langer | ..................... | 182/186.8 |
| 5,025,715 A * | 6/1991 | Sir | ........................... | 99/421 HV |
| 5,137,236 A * | 8/1992 | Burns | .......................... | 248/171 |
| 5,230,491 A * | 7/1993 | Tseng | ..................... | 248/188.1 |
| 5,456,048 A * | 10/1995 | White | ..................... | 52/204.61 |
| 5,499,885 A * | 3/1996 | Chapman | ..................... | 403/380 |
| 5,605,410 A * | 2/1997 | Pantev | ........................ | 403/297 |

(Continued)

FOREIGN PATENT DOCUMENTS

TW        M250048        11/2004

*Primary Examiner*—Nicholas Ponomarenko
*Assistant Examiner*—Pedro J Cuevas

(57) ABSTRACT

A do-it-yourself wind power generation wall includes a plurality of wind power generation modules, each having a bushing, a wind power generation unit and a connecting rod. The exterior of the bushing forms a plurality of insert portions, and the wind power generation unit includes an electric generator connected to the bushing, and a vane wheel connected to the electric generator and formed on a side of the bushing, and an end of the connecting rod is sheathed onto an insert portion of the bushing, and each wind power generation module is connected to form a power generation wall. The invention allows users to freely install the power generation wall according to the environment of the application and greatly enhances the site and scope of using the power generation wall.

10 Claims, 9 Drawing Sheets

U.S. PATENT DOCUMENTS

| | | | | |
|---|---|---|---|---|
| 5,800,121 A * | 9/1998 | Fanelli | ............ | 415/199.5 |
| 5,961,240 A * | 10/1999 | Bobrovniczky | ............ | 403/49 |
| 6,064,123 A * | 5/2000 | Gislason | ............ | 290/55 |
| 6,082,070 A * | 7/2000 | Jen | ............ | 52/650.3 |
| 6,102,357 A * | 8/2000 | Papadatos | ............ | 248/519 |
| 6,314,976 B1 * | 11/2001 | Clarke | ............ | 135/28 |
| 6,531,788 B2 * | 3/2003 | Robson | ............ | 290/43 |
| 6,543,999 B1 * | 4/2003 | Polen | ............ | 416/17 |
| 6,722,471 B2 * | 4/2004 | Wolfe | ............ | 182/186.7 |
| 6,833,633 B2 * | 12/2004 | Wobben | ............ | 290/55 |
| 6,837,016 B2 * | 1/2005 | Simmons et al. | ............ | 52/655.1 |
| 6,841,892 B1 * | 1/2005 | Le Nabour et al. | ............ | 290/43 |
| 6,849,965 B2 * | 2/2005 | Le Nabour et al. | ............ | 290/55 |
| 6,932,561 B2 * | 8/2005 | Yoo | ............ | 415/4.3 |
| 6,938,391 B1 * | 9/2005 | Patel | ............ | 52/846 |
| 6,955,049 B2 * | 10/2005 | Krouse | ............ | 60/641.7 |
| 7,048,241 B2 * | 5/2006 | Crain et al. | ............ | 248/170 |
| 7,124,985 B2 * | 10/2006 | Crain et al. | ............ | 248/188.8 |
| 7,207,534 B2 * | 4/2007 | Crain et al. | ............ | 248/188.8 |
| 7,222,827 B2 * | 5/2007 | Crain et al. | ............ | 248/188.8 |
| 7,291,936 B1 * | 11/2007 | Robson | ............ | 290/43 |
| 7,318,444 B2 * | 1/2008 | Clarke | ............ | 135/29 |
| 7,413,404 B2 * | 8/2008 | Chio | ............ | 416/17 |
| 7,481,235 B2 * | 1/2009 | Prusmack | ............ | 135/135 |
| 7,524,130 B2 * | 4/2009 | Zenda et al. | ............ | 403/292 |
| 2002/0158472 A1 * | 10/2002 | Robson | ............ | 290/43 |
| 2003/0226941 A1 * | 12/2003 | Crain et al. | ............ | 248/166 |
| 2003/0234326 A1 * | 12/2003 | Crain et al. | ............ | 248/166 |
| 2003/0235459 A1 * | 12/2003 | Crain et al. | ............ | 403/170 |
| 2004/0004168 A1 * | 1/2004 | Crain et al. | ............ | 248/188.8 |
| 2004/0101398 A1 * | 5/2004 | Wobben | ............ | 415/4.1 |
| 2004/0160063 A1 * | 8/2004 | Le Nabour et al. | ............ | 290/55 |
| 2006/0086871 A1 * | 4/2006 | Joseph et al. | ............ | 248/178.1 |
| 2006/0118681 A1 * | 6/2006 | Crain et al. | ............ | 248/170 |
| 2007/0014663 A1 * | 1/2007 | Chio | ............ | 416/9 |
| 2007/0086852 A1 * | 4/2007 | Goad | ............ | 403/292 |
| 2007/0257492 A1 * | 11/2007 | Robson | ............ | 290/54 |
| 2008/0054709 A1 * | 3/2008 | Spahr et al. | ............ | 301/9.1 |
| 2008/0075594 A1 * | 3/2008 | Bailey et al. | ............ | 416/104 |
| 2008/0111036 A1 * | 5/2008 | Cartoni et al. | ............ | 248/188.5 |
| 2008/0273975 A1 * | 11/2008 | Chio | ............ | 416/9 |
| 2009/0010759 A1 * | 1/2009 | Ishihara et al. | ............ | 415/220 |
| 2009/0056239 A1 * | 3/2009 | Wolfram | ............ | 52/81.3 |
| 2009/0152413 A1 * | 6/2009 | Takegawa | ............ | 248/170 |
| 2009/0166356 A1 * | 7/2009 | Tsai | ............ | 220/4.01 |
| 2009/0175678 A1 * | 7/2009 | Nientiedt et al. | ............ | 403/171 |

* cited by examiner

DO-IT-YOURSELF WIND POWER GENERATION WALL

BACKGROUND OF THE INVENTION

1. Field of the Invention

The present invention relates to an electric power generation apparatus, and more particular to a wind power generation wall applied to a roof or between windows.

2. Description of Prior Art

As natural resources such as petroleum are extracted and used extensively, the inventory of natural resources becomes increasingly less, their price keeps on climbing, and a huge quantity of greenhouse gases such as carbon dioxide is released, and all of the above are the main causes giving rise to ozone layer depletion and greenhouse effect. Thus, solutions for a substitute of electric power generation such as solar power generation, wind power generation and hydropower generation are provided, and these power generations have become an important subject for manufacturers of the related industry.

A traditional wind power generation apparatus as disclosed in R.O.C. Utility Model No. M250048 includes: a base; a frame erected from the base; a plurality of partitions installed in the frame; a plurality of wind collecting intervals defined inside the frame, each having an air inlet for flowing in air currents and an air outlet for flowing out air current; a vane wheel installed in each wind collecting interval, and pushed and rotated by air current for converting wind energy into mechanical energy, and an electric generator connected to each vane wheel for converting mechanical energy transmitted from the plurality of vane wheels into electric energy.

However, the practical applications of the traditional wind power generation apparatus still have the following problems. Since the traditional wind power generation apparatus comes with a large volume and a fixed structural configuration and requires complicated circuit layout and wire connections to different conducting wires, therefore the overall price is very high. In addition, a plurality of wind power generation units are arranged and installed at upper and lower rows correspondingly, not only wasting spaces, but also affecting the total power generation performance per unit area. The traditional wind power generation apparatus is in a fixed structural configuration, and a large hoist is usually required for the installation, and thus traditional wind power generation apparatuses not only incur high installation fee, but also fit applications at a specific site or environment only, and all of the above reduce the practicability and economic benefits of the wind power generation apparatus. Obviously, the prior art demands immediate attentions and feasible solutions and improvements.

In view of the foregoing shortcomings of the prior art, the inventor of the present invention based on years of experience in the related field to conduct experiments and modifications, and finally developed a do-it-yourself wind power generation wall in accordance with the invention.

SUMMARY OF THE INVENTION

Therefore, it is a primary objective of the present invention to provide a do-it-yourself wind power generation wall composed of small standard components, so that users can freely install the power generation wall according to the environment of its application, and the invention can greatly improve the site and scope of utilizing the power generation wall.

To achieve the foregoing objective, the present invention provides a do-it-yourself wind power generation wall consisted of a plurality of wind power generation modules, and the wind power generation module comprises: a bushing, a wind power generation unit and a plurality of connecting rods, wherein the exterior of the bushing forms a plurality of insert portions, and the wind power generation unit includes an electric generator connected to the bushing, and a vane wheel connected to the electric generator and formed on a side of the bushing, wherein an end of the connecting rod is sheathed onto an insert portion of the bushing, and the wind power generation modules are connected to form a power generation wall.

Another objective of the present invention is to provide a do-it-yourself wind power generation wall that makes use of an alternate arrangement of upper and lower rows of wind power generation units to maximize the performance of a region of a limited area and greatly improve the overall power generation performance per unit area.

A further objective of the present invention is to provide a do-it-yourself wind power generation wall capable of effectively overcoming the difficult installation of traditional wind power generation apparatuses and reducing material and installation costs.

BRIEF DESCRIPTION OF DRAWINGS

The features of the invention believed to be novel are set forth with particularity in the appended claims. The invention itself however may be best understood by reference to the following detailed description of the invention, which describes certain exemplary embodiments of the invention, taken in conjunction with the accompanying drawings in which:

DETAILED DESCRIPTION OF THE INVENTION

The technical characteristics, features and advantages of the present invention will become apparent in the following detailed description of the preferred embodiments with reference to the accompanying drawings. The drawings are provided for reference and illustration only, but not intended for limiting the present invention.

Figure 1:
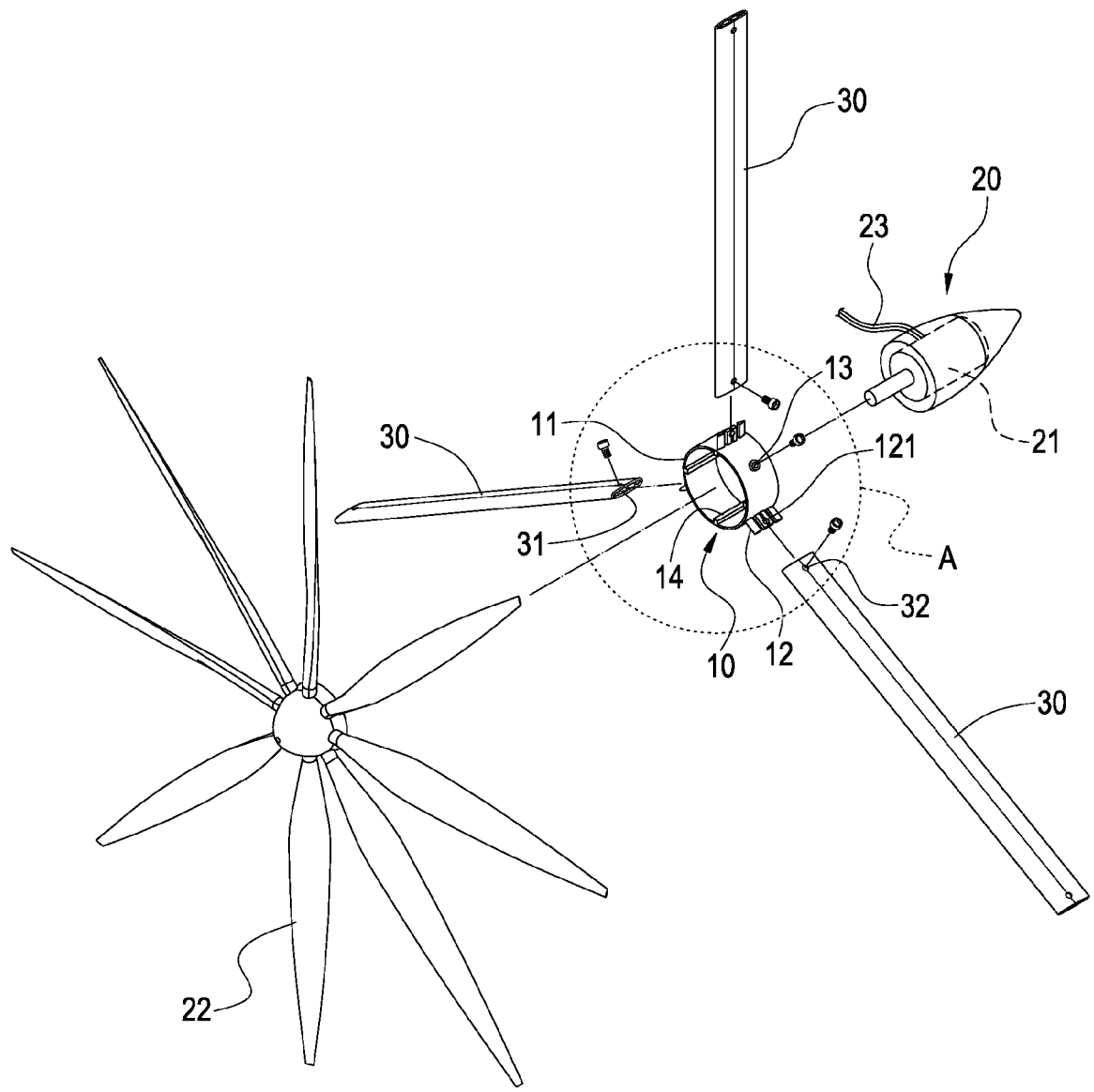
FIG. 1 is an exploded view of some elements of the present invention.
Figure 2:
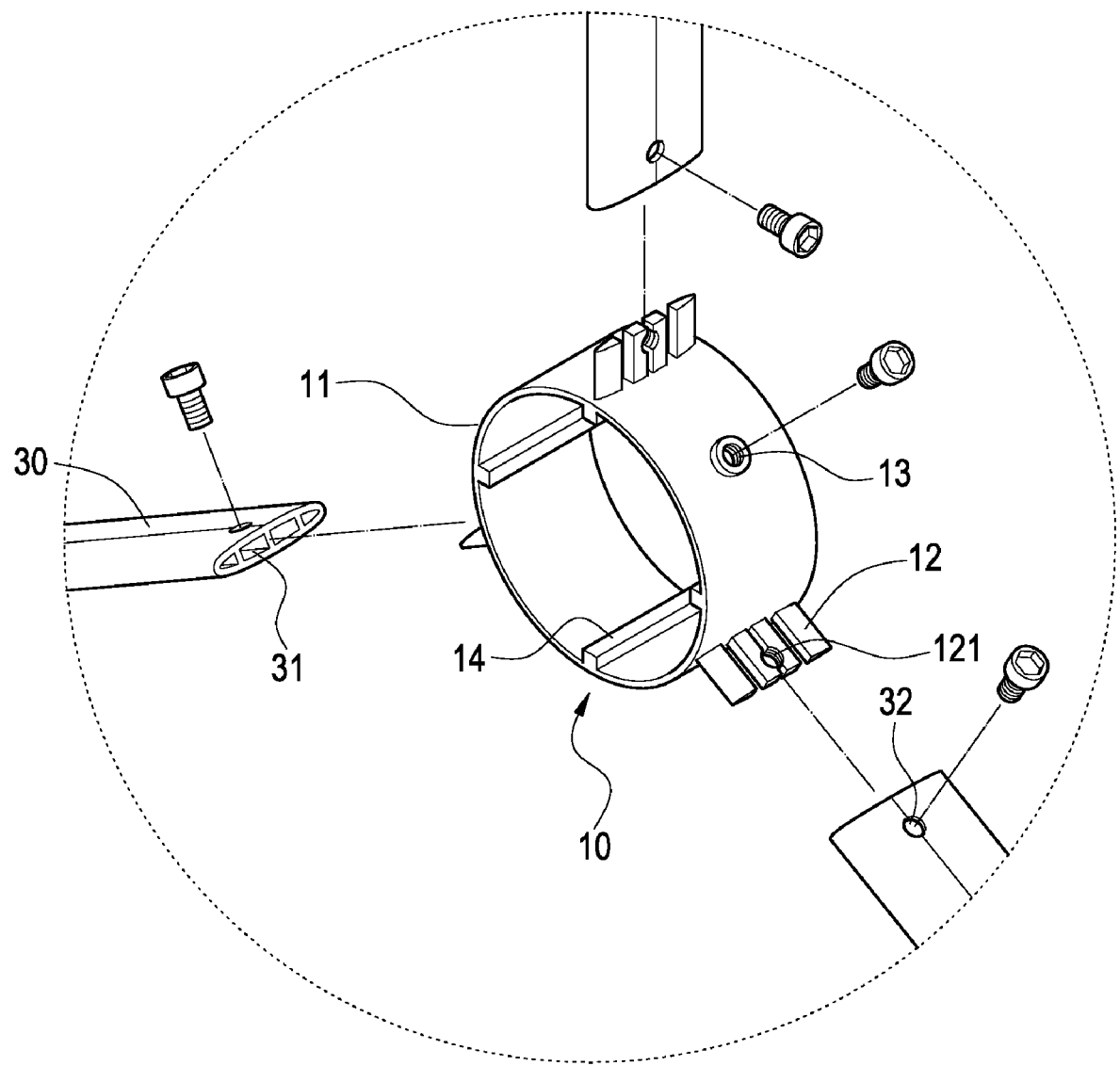
FIG. 2 is an enlarged view of Section A as depicted in FIG. 1.
Figure 3:
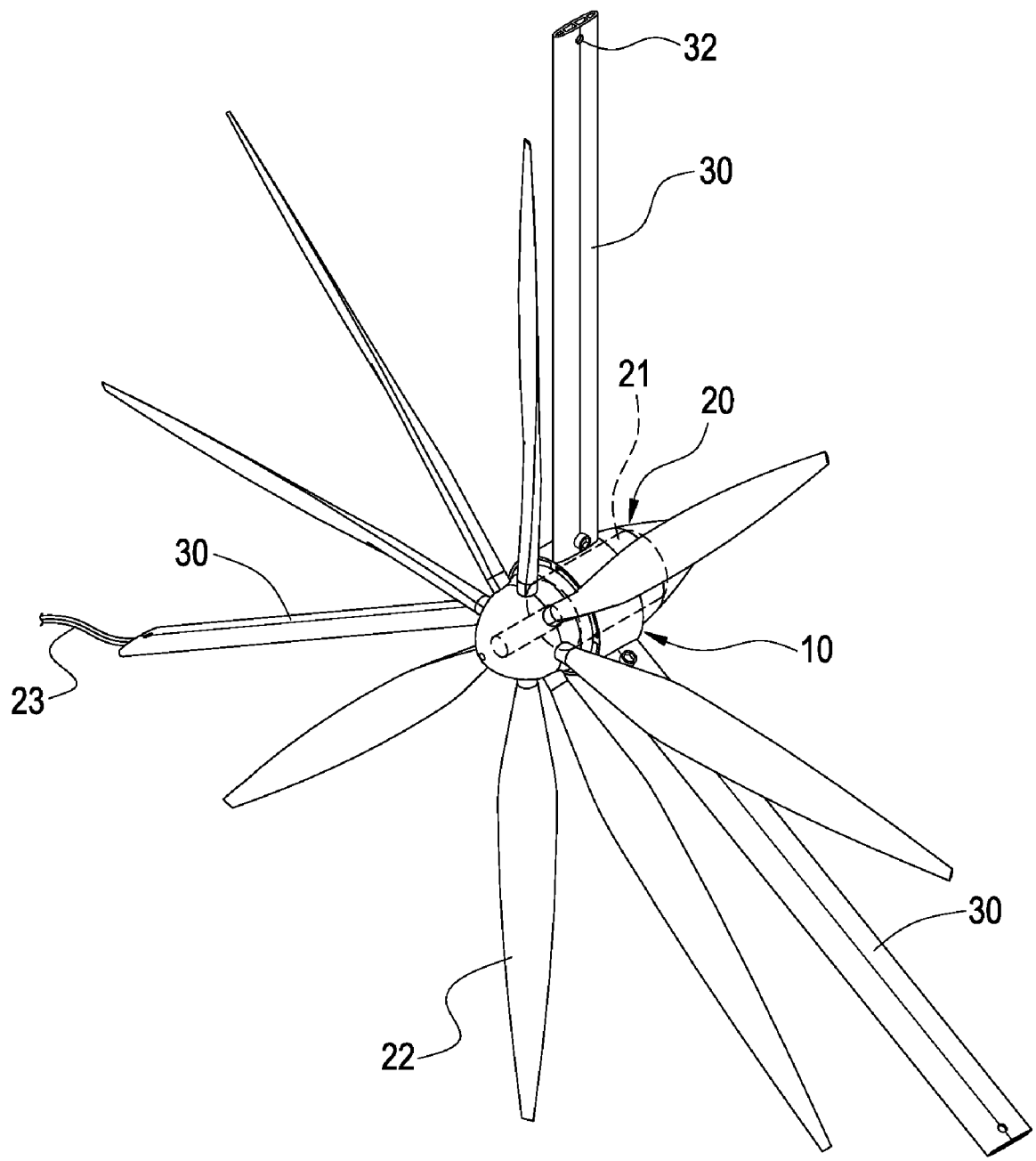
FIG. 3 is a perspective view of an assembly of FIG. 1.

Referring to FIGS. 1 to 3 for an exploded view of some elements of the invention, an enlarged view of Section A of FIG. 1 and a schematic view in accordance with the present invention respectively, the present invention provides a do-it-yourself wind power generation wall formed by a plurality of wind power generation modules, and the wind power generation module of this preferred embodiment comprises a bushing 10, a wind power generation unit 20 and a plurality of connecting rods 30.

The bushing 10 is a cylindrical body 11 including: a plurality of insert portions 12 disposed at the external periphery of the cylindrical body 11, and each being consisted of a plurality of insert bumps protruded from an external surface of the cylindrical body 11, a through hole 121 disposed at the middle of the insert bump, a screw hole 13 penetrated through the cylindrical body 11 and disposed between two adjacent insert bumps, and a plurality of clamping bars 14 with an interval apart from each other and disposed at an internal periphery of the cylindrical body 11.

The wind power generation unit 20 includes an electric generator 21 and a vane wheel 22 connected to a side of an electric generator 21, and the electric generator 21 is consisted of components such as an axle, a rotor and a stator and connected in the bushing 10 and clamped by each clamping bar 14 for assuring the stability of the electric generator 21, and fixtures such as screws can be passed and secured into the screw hole 13 for pressing and fixing the electric generator 21; and the vane wheel 22 comprises a hub and a plurality of vanes connected to the hub and an axle of the electric generator 21 and formed on a lateral side of the bushing 10, such that the electric generator 21 converts the kinetic energy inputted by the rotation of the vane wheel 22 into electric energy, and the electric energy is conducted and outputted through a conducting wire 23 connected to the electric generator 21.

The connecting rod 30 is a hollow aluminum extrusion rod body, and the transverse cross section of the external periphery of the connecting rod 30 is in a winged shape for reducing the coefficient of wind resistance and the value of noise, and both ends of the connecting rod 30 have an embedded slot 31 and a penetrating hole 32 corresponding to the insert portion 12, and the embedded slot 31 is used for sheathing onto an insert portion 12 of the bushing 10, and the penetrating hole 32 is disposed at a position corresponding to the through hole 121 for passing and fixing a fixture such as a screw and an insert pin; and the interior of the connecting rod 30 is provided for passing and accommodating the conducting wire 23.

Figure 4:
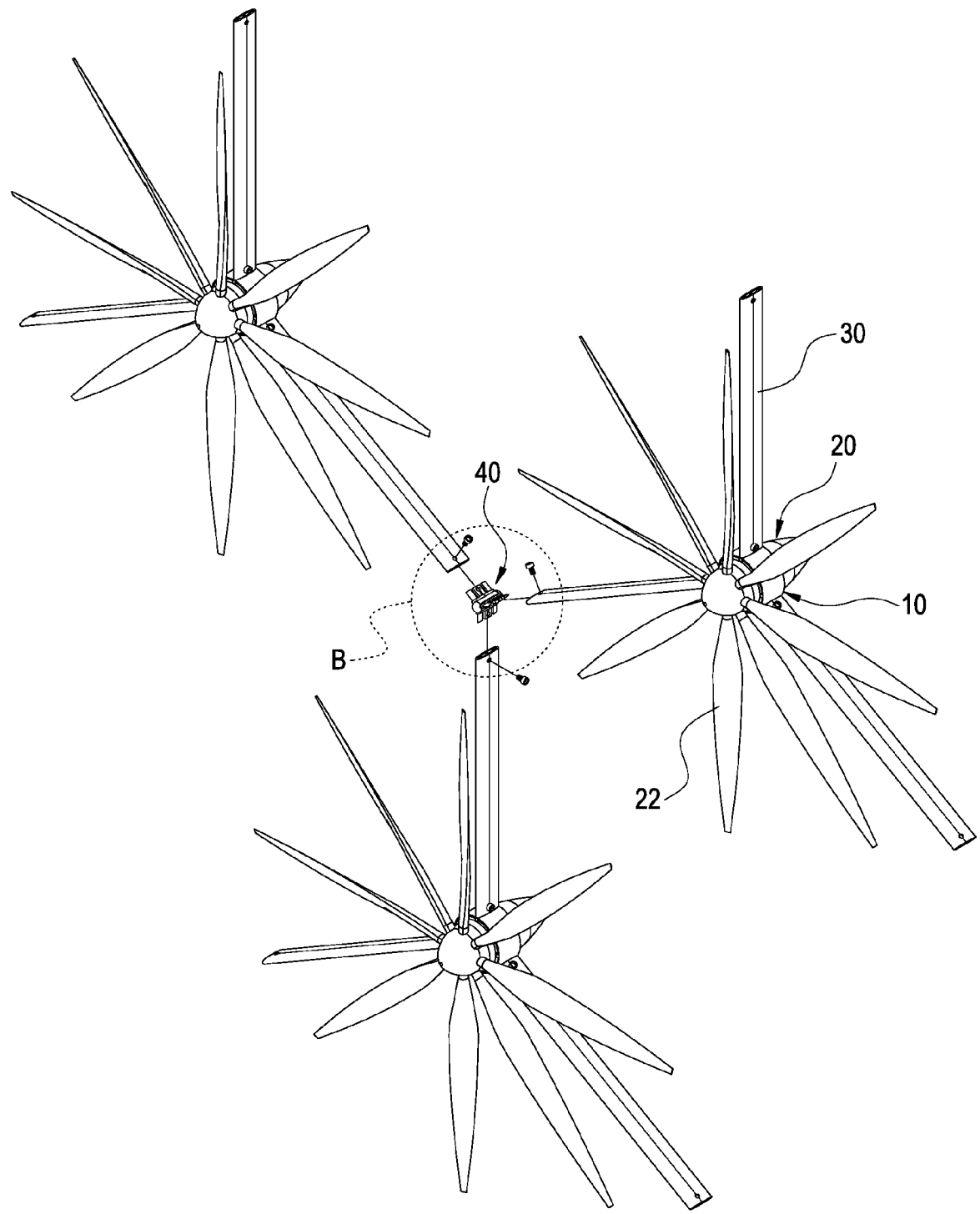
FIG. 4 is an exploded view of a preferred embodiment of the present invention.
Figure 5:
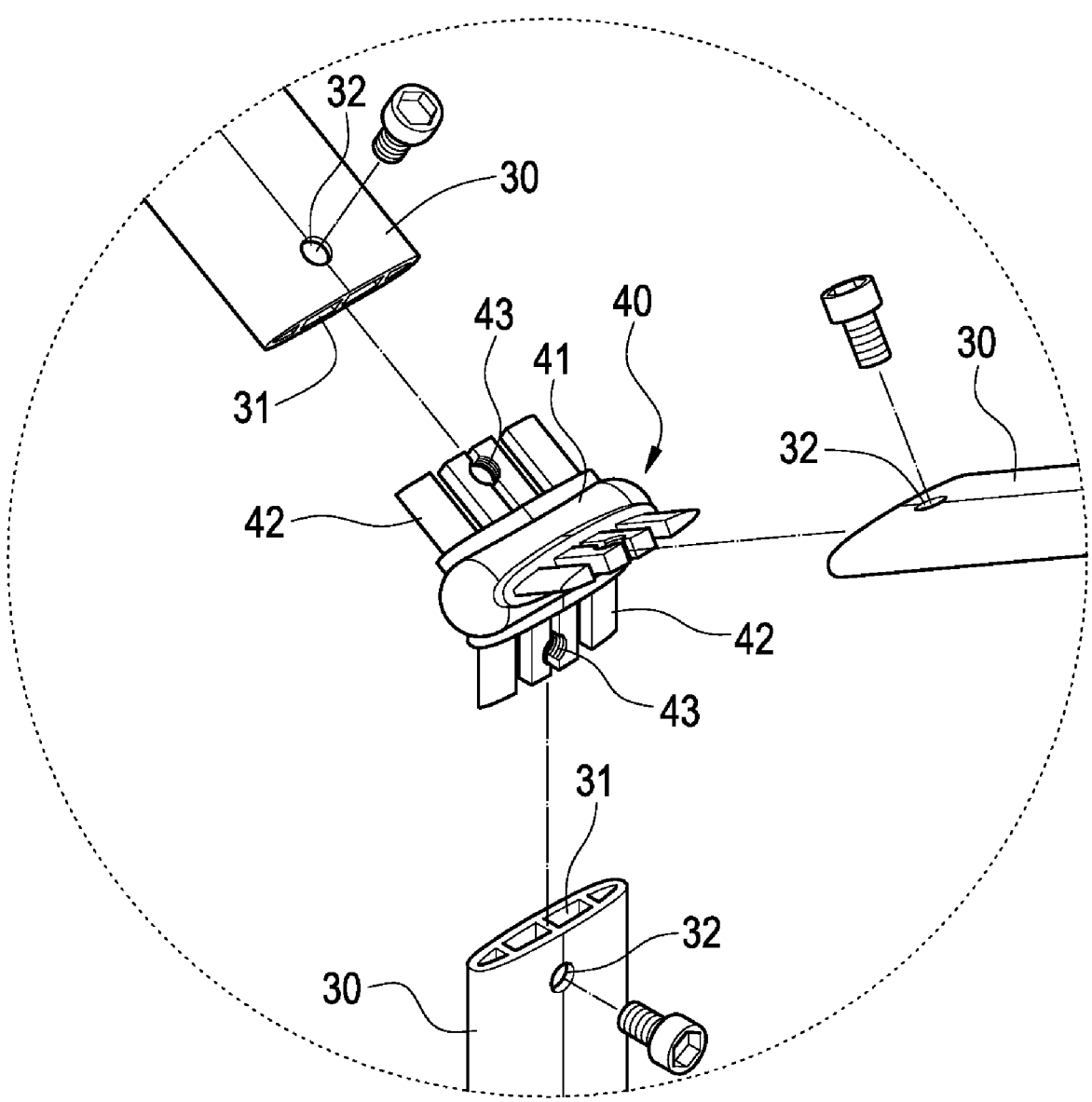
FIG. 5 is an enlarged view of Section B as depicted in FIG. 4.
Figure 6:
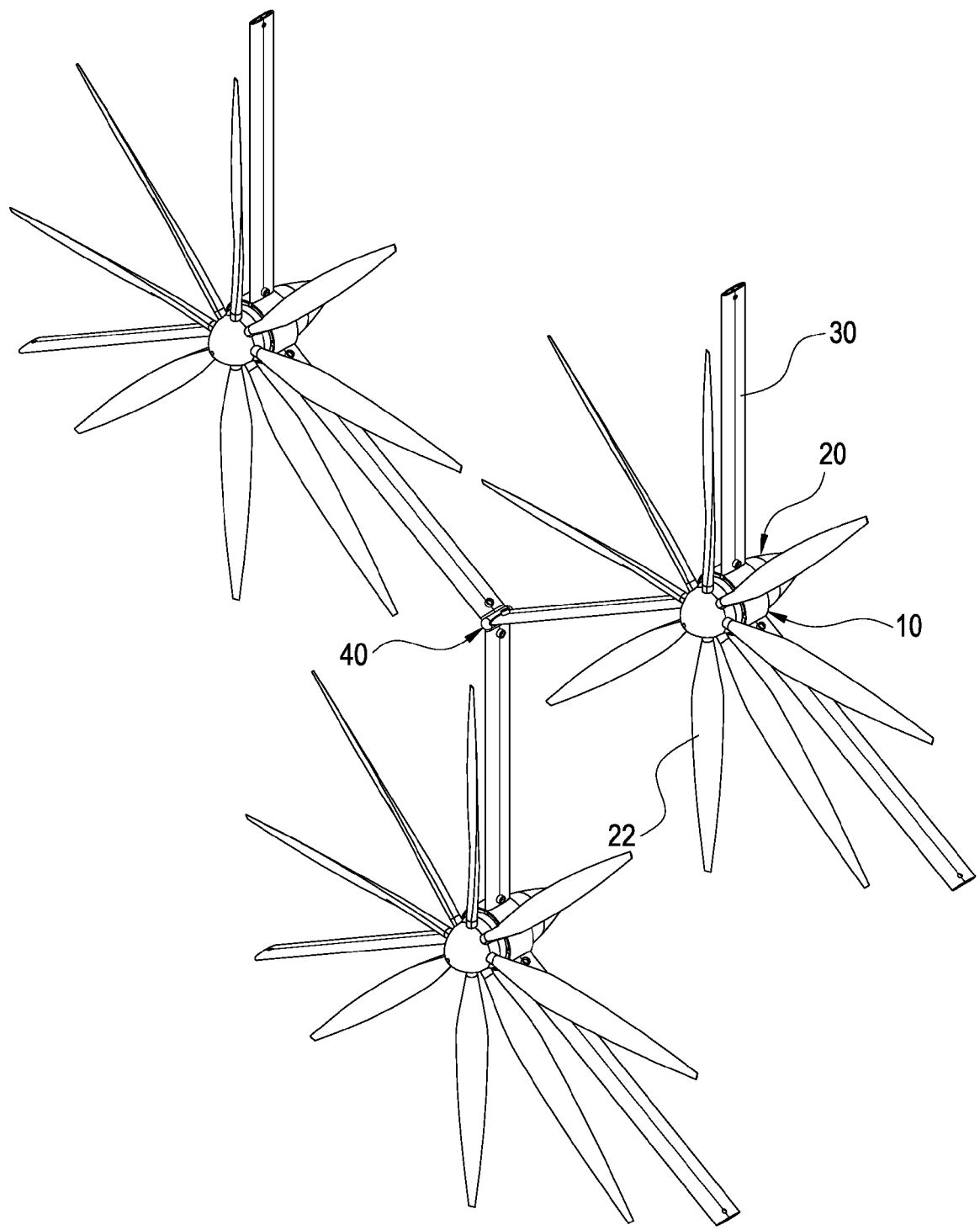
FIG. 6 a perspective view of an assembly of FIG. 4.

Referring to FIGS. 4 to 6 for an exploded view of a preferred embodiment, an enlarged view of Section B of FIG. 4 and a perspective view of the present invention respectively, both ends of the connecting rod 30 can be connected directly to a plurality of insert portions 12 (not shown in the figures) of any two adjacent bushings 10, or this preferred embodiment further includes an inserting element 40 comprised of a cylindrical body 41 and three sets of insert bumps 42 disposed equidistantly from each other and protruded from the surface of an external periphery of the cylindrical body 41, wherein a through hole 43 is disposed at the middle of the insert bump 42 and corresponding to the penetrating hole 32 of the connecting rod 30, and each insert bump 42 of the inserting element 40 is provided for sheathing and assembling the connecting rod 30, which is passed and secured by fixtures such as screws and insert pins for forming a power generation wall by the wind power generation module, and arranging the wind power generation units 20 at the upper and lower rows in alternate positions (as shown in FIG. 6) to give the most effective installation and arrangement within a region of limited area and greatly enhance the overall power generation performance per unit area.

Figure 7:
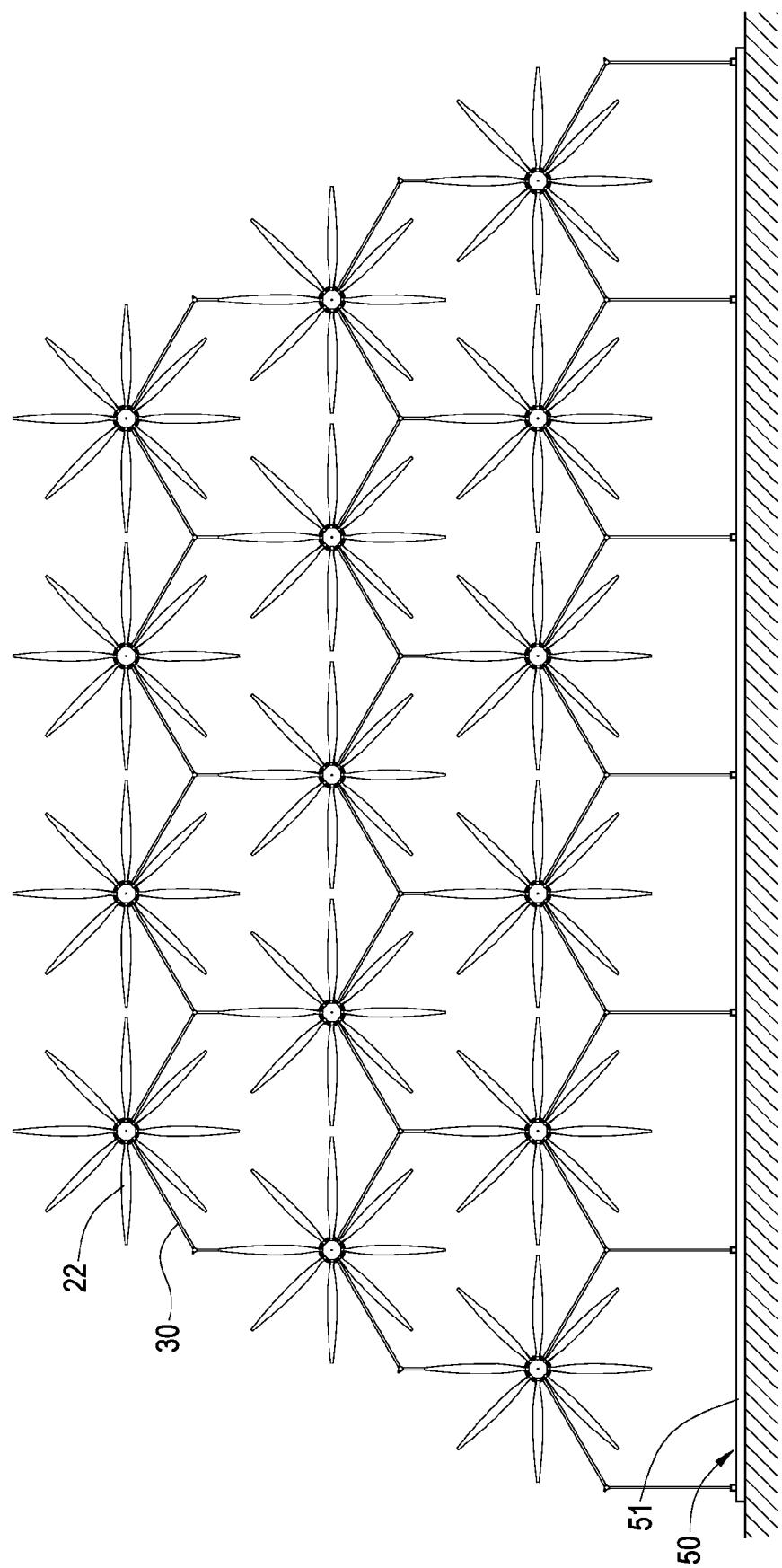
FIG. 7 is a schematic view of an assembly of a preferred embodiment of the present invention.
Figure 8:
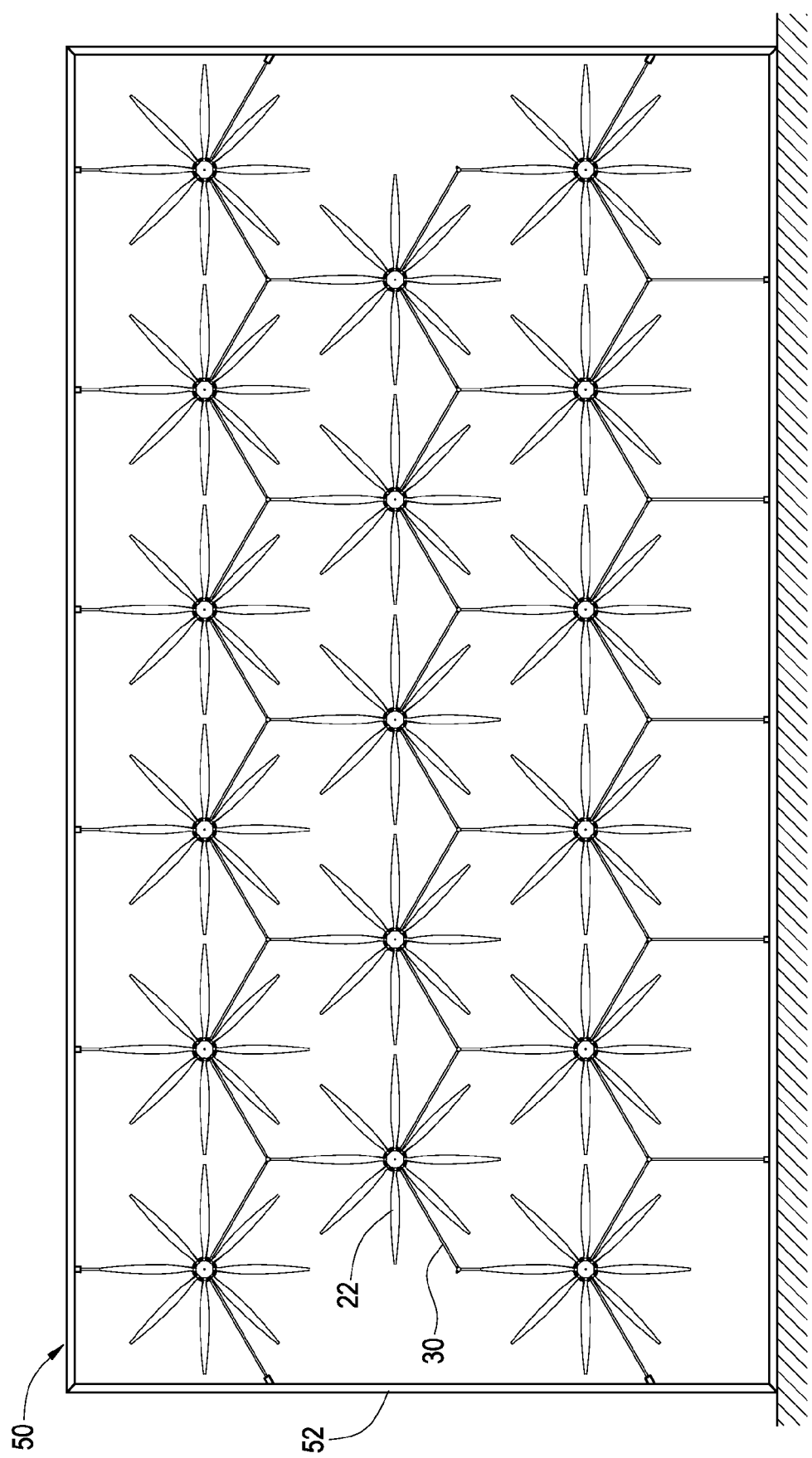
FIG. 8 is a schematic view of an assembly of another preferred embodiment of the present invention.
Figure 9:
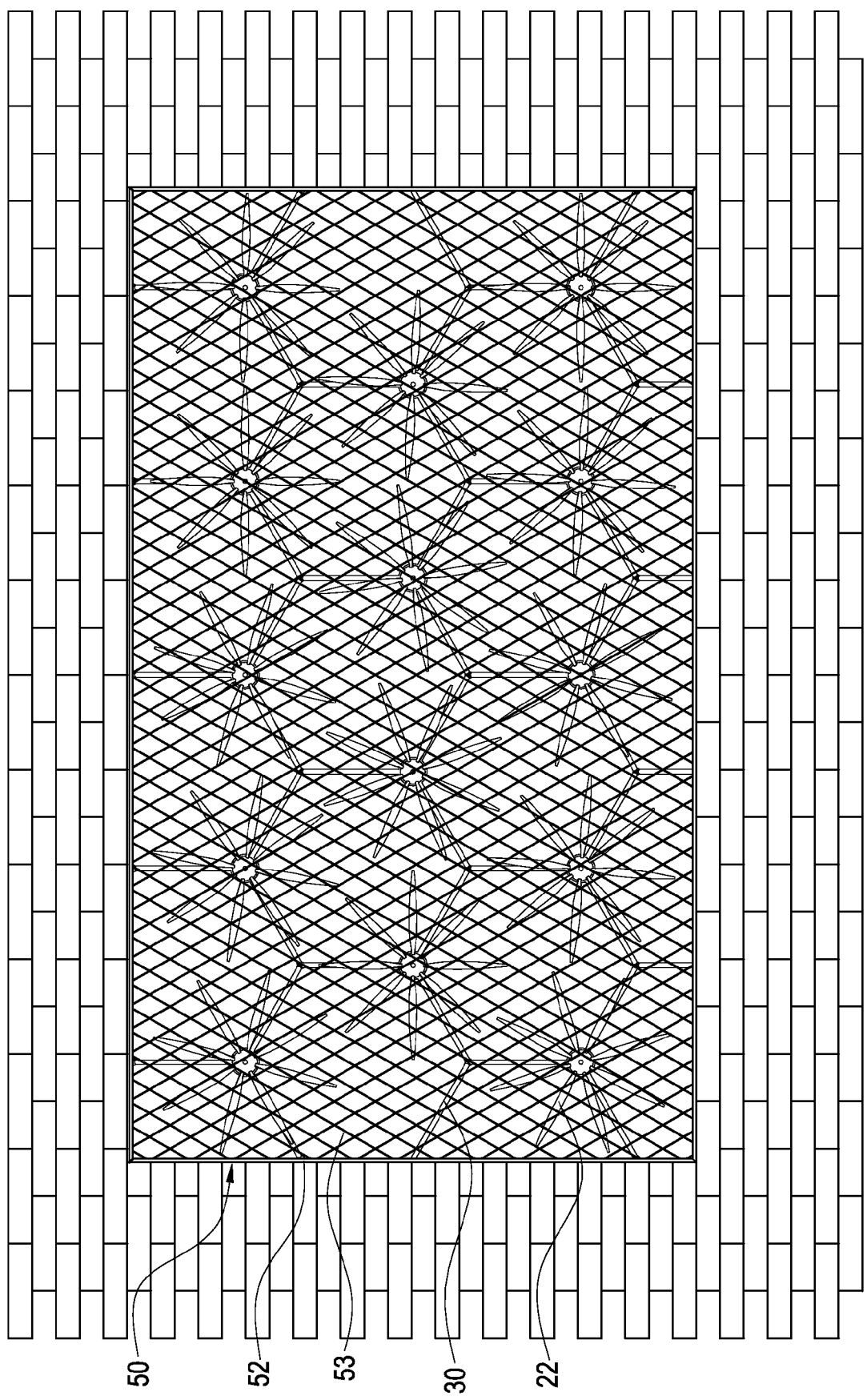
FIG. 9 is a schematic view of an assembly of a further preferred embodiment of the present invention.

Referring to FIGS. 7 to 9 for the perspective views of three preferred embodiments of the present invention respectively, the present invention further comprises a fixed frame 50, and the fixed frame 50 as shown in FIG. 7 is a panel 51, but not limited to such arrangement, and the fixed frame 50 can be made of shaped steel beams or pillars with a quantity depending on the quantity of wind power generation modules, and a plurality of protruded bars (not shown in the figure) disposed equidistantly from each other and protruded from the top surface of the panel 51 for sheathing and connecting another end of the connecting rod 30, and the assembled power generation wall is fixed onto a platform such as a roof. Further, the fixed frame 50 as shown in FIG. 8 is a frame 52 which is in a rectangular shape, a circular shape, a triangular shape or any other geometric shapes. A plurality of protruded bars (not shown in the figure) are disposed on a surface of the periphery of each frame 52 for sheathing and connecting another end of the connecting rod 30, so as to enhance the overall structural strength of the power generation wall. Further, the fixed frame 50 as shown in FIG. 9 is comprised of a rectangular frame 52 and a plurality of intersecting rods 53 disposed at the front side of the frame 52, and an internal side of the frame 52 is provided for sheathing and connecting to another end of the connecting rod 30 and fixing an assembled power generation wall onto a window frame, so that users can appropriately install the power generation wall according to the environment of the actual application, and the invention can greatly enhance the site and scope of using the power generation wall.

The present invention is illustrated with reference to the preferred embodiment and not intended to limit the patent scope of the present invention. Various substitutions and modifications have suggested in the foregoing description, and other will occur to those of ordinary skill in the art. Therefore, all such substitutions and modifications are intended to be embraced within the scope of the invention as defined in the appended claims.

What is claimed is:

1. A wind power generation wall, consisted of a plurality of wind power generation modules, each comprising:
   a cylindrical bushing, having three sets of insert bumps equidistantly protruded from an external periphery thereof;
   a wind power generation unit, including an electric generator connected to the bushing, and
   a vane wheel connected to an electric generator and formed on a lateral side of the bushing; and
   a plurality of connecting rods, each with an end coupled to each set of insert bumps of the bushing for connecting and combining the wind power generation modules to form a power generation wall.

2. The wind power generation wall as recited in claim 1, wherein each connecting rod includes an embedded slot disposed at an end of the connecting rod and corresponding to each set of insert bumps for sheathing onto the insert bumps of the bushing.

3. The wind power generation wall as recited in claim 1, further comprising a screw hole disposed between two sets of insert bumps and penetrated through the cylindrical body, for passing and securing a screw to the electric generator.

4. The wind power generation wall as recited in claim 1, further comprising a through hole disposed on each set of insert bumps, and an end of each connecting rod has a penetrating hole corresponding to the through hole for passing and fixing a fixture.

5. The wind power generation wall as recited in claim 1, wherein the wind power generation unit further comprises a conducting wire connected to the electric generator, and the connecting rod is a hollow aluminum extrusion rod, and the conducting wire is passed and accommodated into the connecting rod.

6. The wind power generation wall as recited in claim 1, wherein the connecting rod has an external periphery with a transverse cross-section substantially in a winged shape.

7. The wind power generation wall as recited in claim 1, further comprising an inserting element, composed of a cylindrical body and a plurality of insert bumps protruded from an external surface of the cylindrical body, for connecting another end of the connecting rod.

8. The wind power generation wall as recited in claim 7, wherein the wind power generation units at any two adjacent upper and lower rows are disposed in alternate positions.

9. The wind power generation wall as recited in claim 7, further comprising a through hole disposed on the insert bump, and a penetrating hole disposed on another end of the connecting rod and corresponding to the through hole, for passing and fixing a fixture.

10. The wind power generation wall as recited in claim 1, further comprising a fixed frame, with a side provided for sheathing and connecting another end of the connecting rod.

* * * * *